Sept. 17, 1957 H. W. BURDETT, JR 2,806,704

PHONOGRAPH RECORD DEVICE AND METHOD OF MAKING SAID DEVICE

Filed March 9, 1951 3 Sheets-Sheet 1

INVENTOR.
Harry Warren Burdett, Jr.
BY Warren Dunbar Foster
Attorney

INVENTOR.
Harry Warren Burdett, Jr.
BY
Warren Dunham Foster
Attorney

PHONOGRAPH RECORD DEVICE AND METHOD OF MAKING SAID DEVICE

Filed March 9, 1951 3 Sheets-Sheet 3

INVENTOR.
Harry Warren Burdett, Jr.
BY Warren Reuben Foster
Attorney 2,806,704
Patented Sept. 17, 1957

2,806,704

PHONOGRAPH RECORD DEVICE AND METHOD OF MAKING SAID DEVICE

Harry Warren Burdett, Jr., Ridgewood, N. J.

Application March 9, 1951, Serial No. 214,667
30 Claims. (Cl. 274—42)

My phonograph record device is characterized by a portion with planar sides surrounding a central vertical opening adapted to receive a post of a phonograph turntable, this portion forming the thickest part of the entire record or record assembly (except in certain later stated cases), and embodying means, preferably magnetic, to lock it to another record upon which it is placed and also to the turntable. I apply my invention either to an adapter or compensator to make possible the playing of a record having a relatively wide central opening upon a turntable having a post of relatively small diameter or I embody it as an integral part of a complete record.

Records in common use today are designed to be played at 33⅓ (herein called 33), 78 or 45 revolutions per minute. While herein I speak only of records of these three speeds now commonly used it will be understood that my invention is applicable to other types. Those of the first two standards, earlier introduced, are relatively thick, heavy and generally of large over-all diameter and have central openings of relatively small diameter adapted to receive a small central post of a turntable. For convenience herein, I follow the trade custom of designating each record by the speed at which it is designed to be played. The widely used records known as "forty-fives," because the first introduced to play at that speed, are relatively small, light and unbreakable and with large central openings. At the present time a large majority of phonographs are equipped with automatic record changers by means of which a plurality of records may be played consecutively without attention on the part of a listener, the mechanism dropping one record upon the top of another, first automatically having removed the tone arm from contact with the first record.

Since many persons wish to play records having large openings (such as the "forty-five") upon multi-speed players which are equipped with small posts designed for the "thirty-three" and "seventy-eight," so-called "adapters" (herein often and in the claims called "compensators") are in use which are placed in large central openings of the "forty-five" records and provided with a small central opening adapted to receive a small post so that they can be played upon a multi-purposed player.

In all types of players wherein records are automatically presented in succession slippage occurs between the record currently played and those previously having been played, upon which the current record rests, and between the bottom record and the phonograph turntable particularly after its surface of felt or some other soft material which supplies considerable amount of friction has become worn. As the pile gradually builds up as one record drops upon the top of another these smooth sided conventional records tend to slip and skid. As a result accuracy of sound reproduction is decreased and the resulting music or speech is not pleasing. To overcome this difficulty records and adapters now in use (or proposed) are provided with protuberances of one sort or another (some resembling gearing and some being prongs) which engage when a plurality of records one on top of another is revolved at the same time and theoretically tend to maintain continuous rotation without slippage. Also various frictional surfaces have been applied to the surface of records or adapters. These expedients in turn cause other difficulties primarily in connection with record changers. My invention avoids these new troubles and solves those problems which others have attempted to overcome.

My invention cannot be fully understood without a brief presentation of the operation of present record changers, particularly of those of a multi-speed or multi-purposed type which accommodate "thirty-three" and "seventy-eight" records, having a small central opening, and also "forty-five" records when equipped with an adapter. Almost all changers for household use work through a central post. The type most commonly applied to these records depends upon the off-setting of this post to assist a movable detent and translating finger, articulated with the tone arm (or in some cases an equivalent translating member engaging the rim of the bottom stored record), to form a shelf on which the records not in use are stacked. Thus above this shelf the post has a record storing function and below a record playing function. After one record has been played this finger moves the bottom record in a horizontal plane off the shelf and permits it to drop upon the record on the playing portion of the post which just has been played. The other records of the stack are held from dropping during this operation and remain upon the upper or storage offset portion of the post until another change is due. Record changers primarily intended for "forty-fives" are later described.

The purpose of the projections extending either from the body of a record itself or from an adapter is to cause rotation of a record which is being played by positive mechanical interlock between it and the record or records which are below it and already have been played, the lowest of these records being in contact with the turntable. Thus it will be seen that during the translation of one record from the storage axis to the playing axis its fixed motion-transmitting projections are likely to engage those of the adjacent record thus jamming the entire operation. Obviously projections which are effective to transmit rotary motion in a horizontal plane during playing also engage and block a movement of translation if they are then in alignment. Also, they may cause such blocking by engagement with other parts such as spokes of an adapter. It of course happens from time to time that these projections are not in such conflicting alignment but I have found the percentage of unwanted engagement to be very high. If the over-all extension of the projections is insufficient to cause blocking if in alignment the projections are ineffective for their purpose.

Other difficulties occur in present phonographs, particularly when records which were originally manufactured for players of other characteristics and makes are employed. In reproducing instruments which have a relatively heavy tone-arm there is a tendency for a record to tip, particularly if the record such as a "forty-five" is smaller and lighter than those which are primarily intended for use with a particular apparatus. Also when thinner and lighter records are used than those for which a particular system is better adapted the operation of the changers now available is likely to be faulty in that two records are dropped simultaneously. Some of the foregoing difficulties are much exaggerated when a record with a large opening which has become warped is used with an adapter.

I overcome all of the above difficulties, either in an adapter for an existing record or in a completely new record, by very simple means and methods. My phonograph device consists of a flat center portion with no projections whatsoever to cause trouble. This center (except in certain instances as explained) preferably extends above the horizontal plane of the remainder of a record when in playing position. My invention is equally applicable to an adapter or to a record built as a unit, each being characterized herein as a "record device."

I preferably accomplish this result by providing a magnetized central portion, duly polarized so that within one half or less of a complete revolution there is necessarily attraction between corresponding portions of adjacent records. My compensators or records completely eliminate relative movement when the records are being played with one engaging another in an automatic phonograph. The contacting horizontal sides of this central portion are planar. There are no projections which on usual adapters and certain records cause records to jam in change mechanisms. Also by provision of greater weight at a central point I counteract the tendency of records when used with heavy tone-arms to tip. The effect of weight is much increased by the magnetic attraction between adjacent records which makes all those actually in contact with each other revoluble as a unit. Increase in thickness at a central portion is particularly necessary in adapters which are designed for use with relatively thin "forty-fives" when such records with adapters in place are utilized upon record changers which best accommodate the relatively thick "thirty-threes" and "seventy-eights," as becomes more fully evident hereafter. Therefore I build up the effective thickness of the records which as originally made are thin so that the likelihood of two records dropping simultaneously is eliminated.

In carrying out my invention, whether in a complete record or in a compensator, I may make the central portion adjacent the effective opening of a magnetizable material. In all magnetic forms of my invention I provide "north poles" and "south poles" so patterned and disposed that attraction is provided between different poles as the phonograph makes an initial partial revolution. Alternatively I may cast magnetized or magnetizable bars or free encapsulated magnetized or magnetizable particles within a plastic material, in suitable shapes and arrangements, or I may insert magnetic or magnetizable material in openings which are formed in a dielectric substance such as wood, ceramics or a laminated paper product. In those cases wherein I do not pre-magnetize the material I place it in suitable magnetic fields after assembly. The amount of magnetic force which is thus placed in each record is critical; it must be insufficient to prevent the dropping of a record which is about to be played on an automatic player yet sufficient to exert the necessary driving engagement between itself and an adjacent record unit, all as is carefully defined hereinafter. Also I apply the methods of my invention to modify existing records and existing adapters so that they conform to my mode of operation and have its advantages or many thereof. The same structure, practices and methods apply to both compensators and to complete records, with minor modifications, all as will be explained hereinafter.

Objects of my invention include the provision of new and improved methods and means which adapt a phonograph record with a large central opening for use upon a phonograph supplied with a small central post and which when applied to a record or to a compensator, in either case either de novo or after it has been made, prevent slippage between records when used in an instrument having a record changer or between a record and a turntable. Other objects include the complete elimination of anti-skid projections on conventional adapters which cause records to jam in change mechanisms while completely conserving all of their intended advantages. Also included are means and methods which counteract the tipping tendency of records and the failure of a changer to drop only one record at a time. Other objects and characteristics will be apparent from the remainder of this specification as well as from the general description which has gone before, consideration of the drawings and the sub-joined claims. It will of course be understood that for purposes of illustration only I am showing certain preferred embodiments of my invention but that changes may be readily made therein without departing from the spirit of my invention or the scope of my broader claims.

In the drawings:

Figures 1 to 10 both inclusive show my record device as embodied in an adapter for compensating for the difference in diameter between a relatively small post of a phonograph turntable and a large central opening of a record originally manufactured to receive a post of relatively large diameter. Figures 11 to 20 (sheet 2), both inclusive, are fragmentary views which show the record devices of my invention, with compensators generally corresponding to those of Figures 1 to 10, both inclusive, respectively in position within phonograph records thereby forming a record unit.

Figure 5:
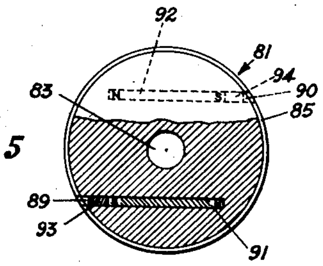
Figure 5 is a plan view, partly broken away and in section, of one of my compensators wherein magnetizable bars have been placed and are held within a plurality of interior openings.
Figure 6:
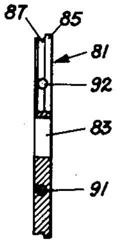

Figure 6, corresponding to Figure 5, is a vertical section partly in elevation.

Figure 7:
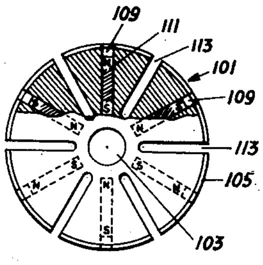

Figure 7 is a plan view, partly broken away and in section, which shows one of my compensators wherein bars of solid magnetizable material are introduced radially.

Figure 8:
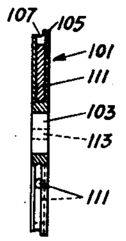

Figure 8 is a vertical section partly in elevation corresponding to Figure 7.

Figure 9:
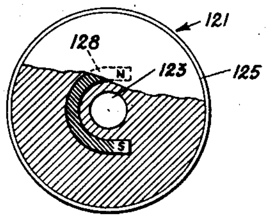

Figure 9 shows another embodiment of my adapter wherein I employ a magnet of a horse-shoe shape, this view being in plan and partly broken away and in section.

Figure 10:
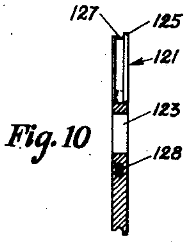

Figure 10 corresponds to Figure 9 and is a central vertical section partly in elevation.

Figure 1:
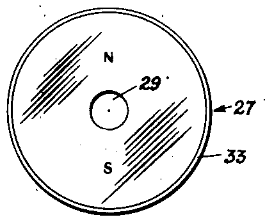
Figure 1 is a plan view of such a compensator formed of a plastic material, which has been magnetized.
Figure 2:
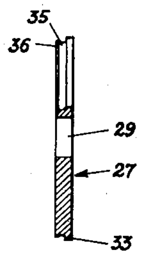
Figure 2 is a central section, vertical or horizontal, corresponding to Figure 1, partly broken away.
Figures 11, 12, 13, 14, 15, 16, 17, 18:
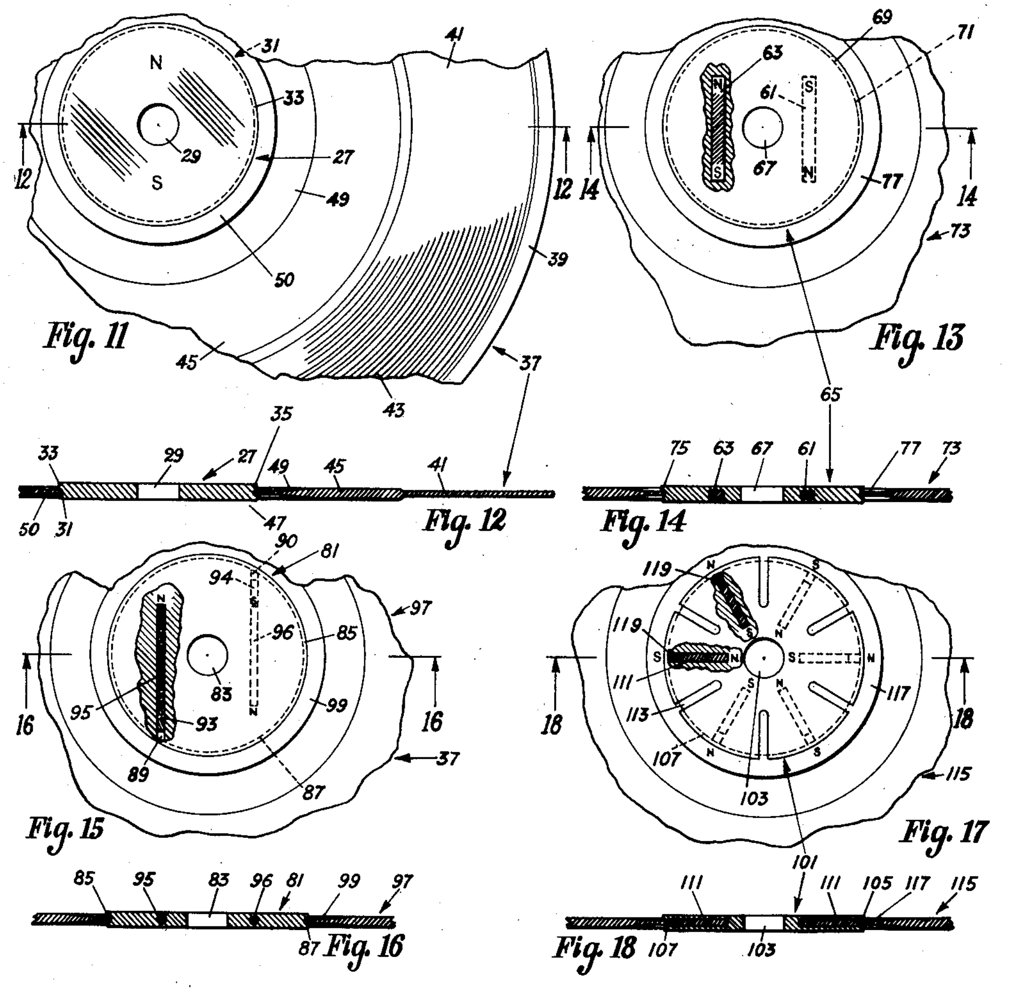

Figures 11 and 12 show record units which generally correspond to compensators of Figures 1 and 2 respectively, a compensator in this instance being of the type having a magnetized plastic disk. Figure 11 is a plan view and Figure 12 is a section taken on the line 12—12 of Figure 11.

Figure 3:
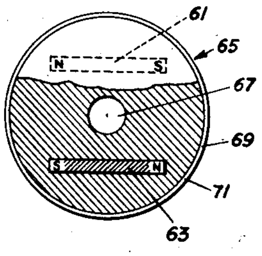
Figure 3 is a plan view partly broken away and in section of another form of my invention wherein solid magnetic bars are embedded in my adapter.
Figure 4:
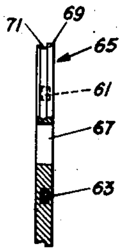
Figure 4 is a central vertical section in elevation showing the subject matter of Figure 3.

Figures 13 and 14 show record units which generally correspond to Figures 3 and 4. Figure 13 is a top plan view partly broken away and in section and Figure 14 is a section taken on the line 14—14 of Figure 13.

The record units of Figures 15 and 16 in some respects correspond to Figures 5 and 6. Figure 15 is a top plan view partly broken away and in section and Figure 16 is a section taken on the line 16—16 of Figure 15.

Figures 17 and 18 show records with my adapters assembled therewith, the compensators being of a type generally corresponding to those of Figures 7 and 8. Figure 17 is a plan view partly broken away and in section of such a record unit and Figure 18 is a section taken on the line 18—18 of Figure 17.

Figures 19, 20:
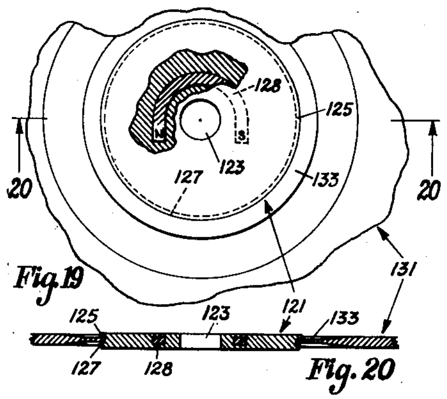

Figures 19 and 20 show the form of my invention as illustrated in Figures 9 and 10 assembled with a record thus forming a record unit. Figure 19 is a plan view partly broken away and in section and Figure 20 is a section taken on the line 20—20 of Figure 19.

Figure 21:
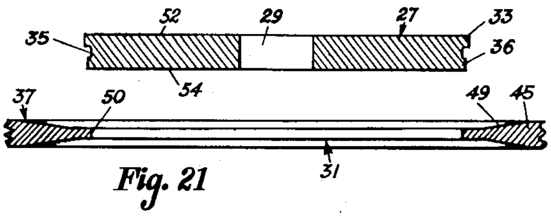

Figure 21 is a fragmentary enlarged and exploded horizontal section showing a portion of the record of Figures 11 and 12 (or of the type of those of Figures 13 to 20 both inclusive) and my compensator disk of the type of Figures 1, 2, 11 and 12 (or of the type of those of Figures 1 to 20 both inclusive) as it is about to be introduced within a record.

Figures 22 to 25 (Sheet 3) both inclusive show my invention applied to and an integral part of complete records.

Figure 22:
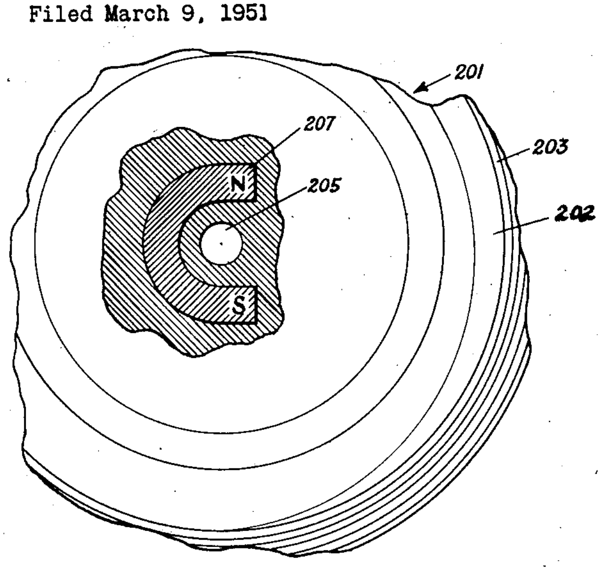

Figure 22 is a fragmentary top plan view partly broken away and in section showing the form of my magnetic unit previously illustrated in the embodiments of Figures 9 and 10 and 19 and 20 as an integral part of a phonograph record.

Figure 23:
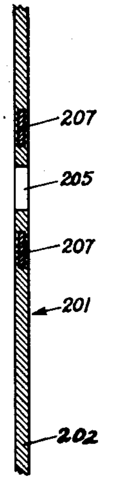

Figure 23 is a fragmentary vertical central section of the subject matter of Figure 22.

Figure 24:
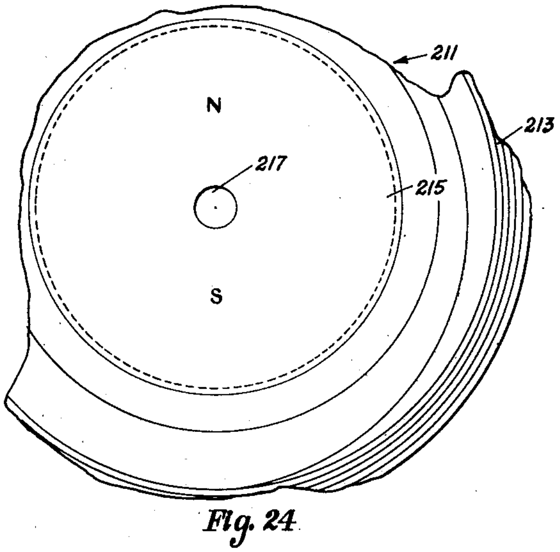
Figure 25:
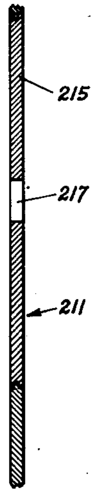

Figures 24 and 25 show integral records embodying a form of my invention analogous to that shown in Figures 1 and 2, and 11 and 12, a central magnetic portion being molded or otherwise formed as a part of a record. Figure 24 is a top plan view and Figure 25 a central fragmentary section.

In this specification and in the sub-joined claims the orientation is that of a record (or phonograph) as in use with one of its flat sides disposed in a horizontal plane. Thus "upper" and "top" and similar words an antonyms are applied to a phonograph record in a horizontal position either upon a turntable or in a stack adapted to be placed in such position. "Horizontal" and like words apply to the plane of a phonograph disk in ordinary playing position and "vertical" and the like to a direction normal thereto parallel or coincident to a post of a phonograph turntable. "Inner" and like words are applied to that part of a phonograph record adjacent a central opening adapted to interfit with a central post of a phonograph turntable and "outer" and the like are applied to the opposite edge of a record relatively distant from the central vertical post and opening therefor. In the drawings the letter "N" is applied to one magnetic pole as "north" or positive and the letter "S" applied to the other as "south" or negative.

In this application, including the claims appended hereto, I use the word "magnetism" as meaning "a force of nature having attractive and repulsive properties peculiar to certain material (e. g. lodestone)" and the word "magnetic" as meaning "currently having the properties of magnetism independently of external excitation." I regard any substance as "permanently magnetized" or possessing "permanent magnetism" when it has such properties of a value sufficient for my device as disclosed and claimed herein to operate for several years of ordinary use. "Magnetizable material" means material capable of permanent magnetization when subjected to suitable and sufficient force. Like words are used with like meaning.

In the form of my invention shown in Figures 1 and 2 a compensator disk in the form of a truncated cylinder generally indicated as 27 is constructed of a plastic material which includes magnetizable particles. Since the particles are very minute they are not shown. A central opening 29 is provided for the reception of a post of a phonograph turntable of small diameter. It will of course be understood that the entire overall diameter of the adapter disk 27 is slightly greater than that of an opening (see Figure 21) which is provided in records which are made for use upon turntables having a large central post. A support for a "forty-five" record is made up of shoulder or flange 33 which overhangs an annular groove 35 with a lip 36 in the edge of the adapter.

As will clearly be seen from Figures 11, 12 and 21 a phonograph record, shown as a "forty-five," generally indicated as 37 includes a large central and inner opening 31 (Figure 21), an outer circumferential rim 39, an intermediate plane surface portion 41 bearing a sound track or sound grooves and a central protective annular portion 45, this protective portion being thicker than the portion bearing the sound track and also of use in the operation wherein records are changed automatically. Lead in and finishing grooves are omitted from all figures except that the finishing grooves are in part shown in Figures 22 and 24. Adjacent its central opening 31 this portion extends into a taper 49 and a tongue 50. This tongue engages the annular slot or groove 35 of my compensator, whereby the record including the plane portion embodying a sound track is supported by the compensator. This tongue has been formed in records of this type for cooperation with operable support shelves and operable selector blades of a record changer of the type manufactured for use therewith, the mechanism of this changer including such shelves and blades which are horizontally disposed within a large central post and are moved outwardly to engage this tongue in the process of changing the records. For a full description of such a record changer reference is made to "Design News," June 1949, pages 14 and 15, Rogers Publishing Company, Detroit, Mich.

It will be noted that each face of these "forty-five" records is formed with three different horizontal plane surfaces parallel to each other. The protective annular surface 45 of one record, which is the thickest portion, engages a similar surface of another when stacked thereon in order to protect the playing surface 43 which is of intermediate thickness and in conjunction with the tongue is necessary in the changing operation when performed upon the apparatus for use with which it is primarily intended. The tongue 50, which in the record before the introduction of any adapter interacts with parts of the mechanism of the changer, represents the thinnest portion, and cooperates, when assembled therewith, with groove 35 of my compensator.

The body of my compensator should be of at least as great thickness as that of the protective portion of the record, and preferably of considerably greater thickness, since otherwise when a "forty-five" record with an adapter is used on a multipurposed player there is danger of jamming since two records are moved together toward playing position. It may be said parenthetically at this point that this greater thickness of a compensator is not necessary with the two other types of records since they are of sufficient thickness so as not to jam in a player built for their use. The horizontal top surface 52 and bottom surface 54 should be flat. This provision of a relatively thick flat adapter when in use with a warped record prevents the warped portion from engaging another record with resulting "wowing." Such warping normally occurs in the relatively thin outer part which carries the sound-producing grooves. This "wowing" results from the warped portion lifting projections of a conventional pronged adapter for that record over the projections of the adapter in its neighboring record, thus destroying driving contact and causing slippage. My flat-surfaced thick adapters prevent this difficulty. Although I much prefer that my adapters be magnetic a portion of the advantages of this invention may be realized by this relatively greater thickness without magnetic attraction. If use is not made of magnetic force to hold one record in firm contact with another when stacked and revolving, the abutting surfaces may be roughened or an adherent material, such as felt, applied thereto to prevent slippage. I have found, however, that provision of a hard, flat, smooth surface through molecular attraction and atmospheric pressure causes a reasonably firm contact between two compensators, in fact in some instances better than that between thick compensators having felt pads or the like, since felt tends to become worn and if applied in the form of a thin annulus distorted. In order to prevent a too perfect union so that one record does not drop from another during the changing operation the surfaces must not be finished with close accuracy. Under ordinary conditions as when there is no difficulty in securing magnetic material I much prefer magnetization.

It will also be noted that my compensator includes three different outer diameters—those of the shoulder, the retaining groove, and the lip upon the side of the groove opposite that wherein the shoulder is disposed. The purpose of the larger shoulder is to prevent the adapter being pushed completely through the large opening when it is installed therein as is later described.

As will have been made clear from the prior portion of this discussion it is of course necessary that each compensator be magnetized, the poles being designated as "north" and "south." To magnetize these disks they are placed in an electromagnetic field or adjacent a permanent magnet in such relation to the lines of magnetic force that polarity such as shown in Figure 1 is obtained. The degree of the magnetic force given each compensator must be carefully determined, as is later determined in detail. This force must be less than that exercised by the weight of the record so that the record will drop when it is disposed in the adapter and yet be sufficient to lock that record to the adjacent record for revolution therewith (or to the turntable) when the records are in operation.

After magnetization, the compensators are ready for sale and for introduction by a user into a record with a large central opening for use upon a player with a small central opening thereby forming what I term a record unit. The process of assembly is very simple, as will be seen from Figure 21. A user first places one segment of groove 35 of my adapter in contact with tongue 50 of the record and flexes the record while applying moderate pressure to the center of the record and if necessary flexing it slightly also. Then the compensator snaps into position with all cooperating parts engaging. This fit is snug, in order to assure driving contact. The diameter of the bottom of the groove 35 of the adapter should therefore be slightly greater than that of the opening defined by tongue 50. Removal merely reverses this process. If a record is slightly distorted after the introduction of my compensator, even if the record is warped, playing excellence is not lessened.

In the embodiment of my invention shown in Figures 3 and 4 and in 13 and 14 two bars 61 and 63 of magnetizable material are molded within an adapter disk 65. It will be noted that the magnetic pattern is such that the relative polarity of these bars is reversed. That is to say the north pole of one is opposite the south pole of the other. A central opening 67, flange 69 and annular groove 71 complete the structure. As is shown in Figures 13 and 14 this compensator may be readily forced within a phonograph record 73 having a central opening corresponding to opening 31 of Figure 21 and a tongue 77 corresponding to tongue 50 of Figure 21. To avoid confusion, no characters are applied to these central openings in these and subsequent figures, the opening and the annular groove 71 coinciding.

In the form of my invention shown in Figures 5, 6, 15 and 16 I make use of magnets or magnet-materials which are inserted after or during the making of a central compensator 81. This disk, like those previously described, includes a central vertical opening 83, a shoulder 85 and an annular groove 87. Two narrow cavities 89 and 90 are formed within the body of the compensator but parallel to its upper and lower surfaces. Within these openings bar magnets 91 and 92 are inserted (as shown in Figures 5 and 6) and held in place as by retainers 93 and 94 respectively. Alternatively (and as shown in Figure 15) iron filings or other magnetizable particles 95 and 96 may be employed in place of the solid magnets, with retainers 93 and 94. As previously described and as is important the relative position of corresponding poles is reversed. That is to say the north and south poles of each pair are disposed relatively adjacent each other and in the same relative position. If ends of corresponding polarity were disposed adjacent each other my device would be operative but if magnets of like polarity in two adjacent records happened to fall relatively close to each, consequently repelling each other, greater relative rotation in a horizontal plane would be necessary before poles of opposite and attracting polarity would be near each other. As will be seen by an examination of Figures 15 and 16 the installation of this compensator in a record indicated as 97 and with a tongue 99 is carried out as previously has been described.

I have described this form of my invention as carried out by the insertion of bars 91 and 92 or filings 95 and 96 after the adapter disk 81 has been fabricated. Alternatively these bars or filings may be inserted by the mold by which the disk is formed. In that case retainers 93 and 94 are not necessary.

The form of my invention which is shown in Figures 7, 8, 17 and 18 is characterized by a plurality of magnet bars, preferably positioned between slots, which permit flexing (as is necessary as an adapter is inserted or removed without undue flexing of the record), and require less material, as is important in times of shortages. The bars (or filings) and slots are shown in radial arrangement, but any convenient configuration which meets the demand for proper magnetic pattern—that is distribution of magnet poles—as elsewhere discussed, may be employed. By virtue of this arrangement the travel of one record after it has fallen upon another with magnets of the same polarity relatively adjacent each other before repulsion can be succeeded by attraction is much shorter. As shown such travel which possibly may be required is limited to a maximum of a sixth of a complete revolution. In this form of my invention a disk generally indicated as 101 is provided with a central opening 103, a flange 105 and an annular groove 107 in the rim. As shown in Figures 7 and 8 a series of radial cavities all indicated as 109 receive small bar magnets all indicated at 111. Alternatively these magnets may be cast within the plastic disk 101 during the initial molding operation. Radial openings 113 increase flexibility and decrease the material required. As shown in Figure 17, a retaining plug 119 is applied to hold the magnetic bars in place. A plug is unnecessary in a casting operation and if the fit between magnet and opening is tight it may be omitted even if bar magnets are applied after the compensator has been molded.

The openings 113 need not be radial. In fact, if a relatively stiff plastic material is employed, I prefer to make them parallel to the magnet bars, or roughly so, to make flexing easier.

This compensator 101 is inserted as previously described within a record 115 having a central opening and a tongue 117 interfitting with groove 107 below flange 105.

Figures 9, 10, 19 and 20 illustrate another form of my record device wherein a horse-shoe magnet is molded within an adapter. A compensator 121 having a central opening 123, a flange 125 and an annular groove 127 is molded with a U-shaped or horse-shoe magnet 128 completely therewithin and embracing the opening, with the north pole upon one side of the opening and the south pole on the other. Insertion of this adapter within a record 131 having a central opening and a tongue 133 is carried out as previously has been described.

It will be understood that in all embodiments the periphery of each of my compensators embodies a mount with which a cooperating formation upon the periphery of the central opening of the record interfits, the outside diameter of the compensator and that of the opening of the record being substantially the same. Thus when a record unit is created by the assembly of record and compensator the compensator supports and drives the record including the planar peripheral surfaces in which the sound track is formed.

I have spoken of my various magnets or magnetizable material being "molded" within the body of the disk. They are carried thereby. Although I much prefer this method of manufacture because of its cheapness and simplicity it should be understood that the magnets or magnetizable materials may be inserted in any desired and practicable manner. It is highly desirable, however, and necessary to the practice of my invention in its entirety that the top and bottom surfaces of the adapter and of the extreme outer top and bottom planes of the record as a whole be flat and it is preferable that they be smooth.

Although I show slots in my compensators only in Figure 7 and those related thereto they may be molded or cut in any embodiment, as for example those of Figures 1, 2, 11 and 12. Slots are particularly useful when the adapter is relatively thick or stiff so that flexure is easily possible when a compensator is inserted or removed.

I prefer to apply my method of the making of compensators complete in one operation but I have used and may use it effectively with adapters of conventional type having projections. Certain existing plastic adapters have fixed radial or other spokes and a plurality of projections extending vertically therefrom on each side. I affix simple bar magnets to each side of certain of these spokes, preferably those from which no projections extend, the thickness of the magnets being equal to or slightly less than the height of the projections over the corresponding plane of the spokes. I place the magnets so that the poles of at least one magnet on each side are opposite in a radial direction to the other two. The corresponding magnets on the other side should be similarly arranged and preferably with their polarity reversed over that of the corresponding magnet on the other side of the adapter. They thus tend to reinforce one another thereby prolonging their life. After the magnets are firmly in place I fill in the remaining volume between the plane represented by the tops of oppositely extending projections so that a thick flat-sided magnetic compensator results. I prefer to fill up the central opening in advance with plastic wood or whatever other material I wish to use and later after it is set to drill it out in order to assure smoothness and continuity of the walls of the central opening so that the post and other portions of the change mechanism will work effectively. A finished compensator so produced is similar to the form of my invention shown in Figure 7.

I have also modified adapters of this type by filling the space between the spokes with plastic wood or other similar material, placing a horse-shoe magnet in position generally as shown in Figure 9 and building up the plastic wood to form a flat continuius surface on each horizontal side, the central hole preferably being filled with the plastic material and later drilled out. In any case it is desirable to sandpaper or otherwise smooth the top of each horizontal surface.

Similar methods may be employed with other adapters and following other exemplifications of my invention. In any such case the resulting compensator must have flat horizontal sides and exert a magnetic force.

As previously stated and as is shown in Figures 22 to 25 both inclusive I may apply my invention to an integral record as well as to a compensator. While one important object of this invention is to present a satisfactory compensator I stress the fact that the provision of smooth gripping means whereby records played with one on top of another will not slip, slide or skid is of the first order of importance. Moreover, a record built complete with my invention embodied therein by the added weight at a central portion is much less likely to tilt and cause trouble in the process of automatic change or playing.

As is shown in Figures 22 and 23 I may provide a record 201 integral with and supporting an outer plane surface portion 202, grooves 203 with differing configurations representing sound making up a sound track and a fixed, relatively small central opening 205. As this record is formed I embody therein a magnet shown as of the U-shaped or horse-shoe type 207. Alternatively this magnet may be placed within the body of the plastic material making up the record by any practicable method, although I much prefer to mold it in place.

Figures 24 and 25 show a record 211 with a sound track 213 and a central permanent insert 215 made of magnetizable material. This insert has a central opening 217 for the reception of a spindle and supports the plane surface portion peripheral thereto which embodies the sound track. I magnetize this material one portion being positive and the other being negative.

For purposes of illustration only I am showing only two forms of my invention applied to an integral or complete record. It will be readily understood that all forms may be so applied to a complete record. The magnetic or magnetizable substance preferably is molded as a part of the record. In the case of free magnetizable particles I first place them within a capsule and mold it into place.

Thicker records such as the "seventy-eight" are often manufactured with a central sheet of backing material between the two sheets in which sound grooves are molded. In applying my invention as an integral part of such records I may make this central sheet of magnetic or magnetizable material. Thus I secure the advantages of this invention without the addition of a separate part. Also, to any form of record I may apply a central magnetized sheet.

In the previous portions of this specification I have described magnetic or magnetizable material as applied to a central portion or, as stated immediately above, to the entire horizontal area. Alternatively I have found it practicable in records which have sufficient thickness to apply the magnetic material, preferably in the form of small bars, to the peripheral edges, inserting the magnets within the cross-sectional area of the record as a whole so that the edges and sides are smooth.

I have illustrated my invention as integrally embodied only within records having a small central opening but it will be understood that it can also be applied in any of its embodiments to "forty-five" records with the large central openings. I apply any of my magnetic arrangements in shapes such as shown in Figures 11, 12 and 21, the magnetic material preferably being confined to the thick protective annulus 45. Although a "forty-five" record played upon the record changer made therefor presents fewer difficulties than when such a record is used with a conventional adapter upon instruments intended for "thirty-three" and "seventy-eight" records certain of the above noted difficulties do occur but are remedied when my device is embodied integrally in such a "forty-five" record.

My method can be applied to existing records. I form openings either in the periphery of a relatively thick record or in the central portion thereof and introduce small magnets or magnetizable bars which are later magnetized or discrete magnetized or magnetizable particles placed within a capsule. In such cases I place a plastic material such as plastic wood over the magnet or capsule so inserted in order to secure a relatively smooth external surface. Also I may so insert a horse-shoe magnet as is shown for example in Figure 19. Alternatively and when the characteristics of a record changer permit I place magnets or material which is magnetized upon the top or bottom surfaces, either central or peripheral, of a finished record and over lay such magnets or materials with a plastic material to which a flat outer surface is given.

As previously stated, I prefer to make my compensator from a plastic material, but other substances may be used—steel, iron or steel or other alloys, wood, certain paper products, or magnetizable ceramics. If steel or iron or an alloy is employed, slots, radial or tangential, as shown in Figure 7 and those related thereto or described in connection therewith, are necessary so that the adapter can be flexed readily for insertion or removal.

With a metal which can be magnetized there is of course no point in making use of any form other than those of Figures 1, 2, 11 and 12. No bar magnet is introduced, but the entire mass is magnetized. If wood is used, I may employ an end miller to form the necessary magnet-receiving openings, insert the bar or bars, pre-magnetized or later magnetized, and fill the open ends or sides of the bores with plastic wood or the like. I also may employ laminated paper, placing the magnets in cut-outs in central sheets of the lamination so that the top and bottom surfaces are flat and smooth. The same substitutes can be used in records with which my device is integral, although in such cases provision for flexing is unnecessary. In such instances a central disk formed as taught herein is cemented into place. These alternatives are particularly useful in times of material shortages.

In all embodiments of my invention the relation between the magnetic force of my compensators or records and the weight of the record unit is critical. The magnetic force exerted by each unit must be sufficient to form a non-slipping, driving engagement between two records of which one is being currently played and the one or more disposed on the turntable the playing of which has just been completed yet such force must be insufficient to prevent the dropping of a record when it is about to be played. It should be recognized that this magnetic force which forms a driving engagement exerts itself in two ways. First, it increases the frictional contact between the playing and played record or records by in effect increasing the weight of the upper record. Also it should be remembered in this connection that by the use of my adapter I literally increase the weight of each record unit. Second, the magnetic force applies a torque resistance—that is a resistance to a turning or separating movement between the records which has nothing to do with friction or weight.

To illustrate this important phase of my invention one may well consider a stack of "forty-five" records, of the type shown in Figures 3 and 4 and 13 and 14 in storage position on a changer with a central post of relatively small diameter. If the bottom record of the storage stack is to drop when the change operation occurs its weight must be greater than the maximum attractive magnetic force between itself and the next record in the stack. Maximum attractive force occurs when opposite magnetic poles of the two record units are aligned and when the records are in the closest proximity as in this case.

The magnetic force operative between relatively adjacent bar magnets may be written:

$$F_M=\frac{M_1M_2}{\mu r^2}$$

where $F_M$=magnetic force (dynes)
$M_1$=pole strength of first magnet (unit poles)
$M_2$=pole strength of second magnet (unit poles)
$\mu$=permeability of medium between magnets
$r$=distance between poles (cm.)

The weight of a typical record-compensator combination or record unit is about 50 grams. The separating force due to the weight of the bottom record unit when it is about to be dropped is:

$$F_s=ma$$

where $F_s$=separating force (dynes)
$m$=mass of record unit (grams)
$a$=acceleration due to gravity (cm./sec.$^2$)

given:

$$m=50 \text{ grams}$$

$$a=980 \text{ cm./sec.}^2$$

substituting $$F_s=50\times980=49{,}000 \text{ dynes}$$

Thus the separating force ($F_s$) in the above example is equal to 49,000 dynes. This figure becomes the maximum net attractive magnetic force which is permissible in any record unit. The following assumptions are employed as the basis for computing the maximum permissible strength of each pole ($M_1$ and $M_2$). It is assumed that adjacent unlike poles are of equal strength—that is that $M_1$ equals $M_2$. It can safely be assumed that the permeability ($\mu$) of the surrounding medium is close to unity. Since the bar magnets are embedded approximately .02 cm. below the surface of each compensator the effective adjacent distance between the poles is approximately .04 cm. This condition results in the following:

$$F_M\frac{(M_1)^2}{\mu r^2}$$

since $M_1=M_2$ and $$M_1=\sqrt{F_M\mu r^2}$$

Substituting known quantities $$M_1=\sqrt{49{,}000(1)(.04)^2}=\sqrt{78.5}$$

$$M_1=8.9 \text{ units of magnetic pole strength}=M_2$$

These calculations inherently assume only one effective pole per record unit. Since the magnetic force system involves two record units, illustrated in this discussion of the type shown in Figures 13 and 14, there is a total of four pole pairs. Therefore any pole strength is equal to ¼ the calculated value or 8.9 divided by 4 which equals 2.25 unit poles. (A unit magnet pole is one of such strength that it will exert a force of one dyne upon an equal pole in a vacuum (or air) when placed one centimeter away from it.) In this calculation the repulsion of the opposite pole of a given magnet on the correspondingly attracted pole of the pair has been disregarded because of the relative remoteness of the two poles and the effect of the law of inverse squares. Also this effect provides a slight margin of safety to assure that the net attractive force will be less than the separating force.

By the use of the above formulae it is of course possible to calculate the maximum magnetic force which permits the dropping of the records when a change takes place. It will now be shown that this magnetic force is ample to overcome the maximum slippage torque of a tone arm at the start of the playing of a record when it is at its greatest. The "forty-five" record may be taken to weigh 37 grams and the compensator 13 grams making the weight of the record unit 50 grams. The effective addition from the stand-point of drive attributable to weight and its equivalent is another 50 grams as has been shown above. Therefore there is a frictional drive proportional to a value of 100 grams in addition to the magnetic force which resists torque. With a tone arm weighing 14.2 grams and a moment arm of 8.9 centimeters the resulting torque is 126 gram-centimeters. If one assumes a friction factor of .06 for the needle on the record, as is considerably greater than has been found in practice, the result is 7.6 gram-centimeters which is the equivalent of 7,450 dyne-centimeters of resisting torque. This figure represents the maximum slippage torque of the tone arm at the start of the operation. The effective radius of the magnetic unit may be taken as 1.7 centimeters which at 49,000 dynes as developed above equals 83,000 dyne-centimeters to overcome the initial maximum slippage torque of 7,450 dyne-centimeters—a safety factor of over 10 to 1. It will thus be seen that the magnetic attraction which is sufficiently weak to permit the dropping of a record in the change operation has ample excess force to resist slippage torque without the additional resistance to slippage supplied by the frictional effects as previously described.

The advantages of my invention will have been made clear from the above portion of this specification and the drawings and are reflected in the subjoined claims. They include the provision of a phonograph device, integral with or adapted to be joined to a record, wherein a central portion with smooth exterior horizontal surfaces firmly grips another similar device placed upon it thus preventing slippage, such gripping preferably being accomplished by magnetic force. The advantages also include the provision of a compensator of the above and other desirable characteristics whereby a phonograph record with a large central opening may be effectively played upon a phonograph having a turntable with a post of a relatively small diameter. Also included is the provision of a compensator with flat horizontal faces which project beyond the corresponding horizontal planes of a record itself.

I claim:

1. In a phonograph record device for use with a revoluble turntable of a phonograph, a central portion having a central vertical opening to receive a post of the phonograph turntable, permanently magnetized material embodied within the cross sectional area of said device, and a support for a sound track, the force of said permanently magnetized material being of substantially constant and uniform level and being sufficient to retain said device in non-slipping driving engagement with another similar record device in juxtaposition therewith upon the turntable.

2. In a phonograph record device for use with a revoluble turntable of a phonograph, a central portion having a vertical opening adapted to receive a post of a phonograph turntable and having a support for a plane surface which embodies a sound track, said central portion having flat horizontal sides which are disposed respectively above and below the upper and lower horizontal planes respectively of all other portions of said device, and permanently magnetized material disposed within the cross sectional area of said device, the force of said permanently magnetized material being of substantially constant and uniform level and being sufficient to retain said device in non-slipping driving engagement with another similar record device in juxtaposition therewith upon the turntable.

3. In a phonograph record device, a permanently magnetized center, said center having a vertical opening adapted to receive a post of a phonograph turntable and to be revoluble therewith and having a support for a plane surface which embodies a sound track, said permanently magnetized center having flat horizontal parallel sides which are disposed respectively above and below the upper and lower horizontal planes respectively of all other portions of said device, the force of said permanently magnetized center being of substantially constant and uniform level and being sufficient to retain said device in non-slipping driving engagement with another and similar record device in juxtaposition therewith upon the turntable.

4. In a compensator for ready insertion within and ready removal at will from an opening of a phonograph record having a central opening of a relatively large diameter, a permanently magnetized disk, said disk having a central vertical opening adapted to receive a central post of a phonograph turntable of relatively small diameter and having a mount upon its periphery for supporting and driving a phonograph record having such a central opening of a relatively large diameter substantially equal to that of said disk, the force of the permanent magnetization of said disk being of substantially constant and uniform level and being sufficient to retain a record into which said disk is inserted in non-slipping driving engagement with another record in which a similar disk has been inserted when said two records are mounted in juxtaposition upon the turntable.

5. In a compensator of the class described, a disk having flat parallel and horizontal sides and a central vertical opening normal to said flat sides and adapted to receive a post of a phonograph turntable of relatively small diameter, a pattern of permanent magnetism embodied in said disk, different poles in said pattern being disposed opposite each other on different sides of said central opening, said disk also embodying a mount for detachably supporting and revolving a phonograph record having a relatively large central opening of a diameter substantially equal to that of said disk and the force of the permanent magnetism of said pattern being of substantially constant and uniform level and being sufficient to retain said record when said compensator is assembled with said record in non-slipping driving engagement with another record having another similar compensator assembled therewith when the two records each with its compensator are in juxtaposition upon the turntable.

6. A compensator of the class described, said compensator consisting of a disk with flat and parallel and horizontal sides and having a relatively small central vertical opening with an axis normal to that of said sides adapted to receive a post of a phonograph turntable, a pattern of permanent magnetism embodied in said disk, said pattern having a plurality of pairs of north and south poles disposed with unlike poles of each pair relatively adjacent each other, said disk embodying a mount for detachably supporting and revolving a phonograph record having a relatively large central opening of a diameter substantially equal to that of said disk and the force of the permanent magnetism of said pattern being of substantially constant and uniform level and being sufficient to retain said record when said compensator is assembled with said record in non-slipping driving engagement with another record having another similar compensator assembled therewith when the two records each with its compensator are in juxtaposition upon the turntable.

7. A compensator of the class described, said compensator comprising a disk having planar parallel horizontal sides and a central vertical opening of relatively small diameter for the reception of a post of a phonograph turntable and openings in a plane substantially parallel to that of said sides for the reception of permanently magnetized material, permanently magnetized material within said last mentioned openings, and formations upon the periphery of said disk for detachably supporting and driving a phonograph record having a central opening of relatively large diameter, the outside diameter of said disk and that of said central opening of said phonograph record being substantially the same, said record being adapted for use with a phonograph having a turntable, the force of said permanently magnetized material being of substantially constant and uniform level and being sufficient to retain a record supported by said disk in non-slipping driving relation with another record which is supported by a similar disk, when said two disks and the records supported thereby are being revolved by the turntable.

8. A compensator adapted to convert a phonograph record having a central opening of relatively large diameter and a supporting formation surrounding said opening for use upon a phonograph turntable having a vertical central post of relatively small diameter; said compensator being a flat plastic disk embodying finely divided permanently magnetic particles, said disk having a central vertical opening of a diameter to receive said post, the magnetic pattern of said disk including one pole disposed upon one side of said central opening and the other pole disposed upon the opposite side thereof, and said disk having a peripheral mount adapted to interfit with the supporting formation surrounding the large central opening of said record thereby when said compensator is disposed within said opening forming a record unit and driving said record, the force of said permanently magnetized particles being of a substantially constant and uniform level and being sufficient to retain said unit in non-slipping driving engagement with another similar record unit when the two record units are disposed in juxtaposition on the turntable, whereby the revolution of either of said units acting through the magnetic force of said compensators drives said other unit in synchronism.

9. In a compensator of the class described, a disk with flat parallel horizontal sides and a central vertical opening for the reception of a vertical post of relatively small diameter of a phonograph turntable, a plurality of permanent magnets carried by said disk within the cross sectional area thereof and spaced from the periphery thereof, and a mount upon the periphery of said disk for supporting and driving a phonograph record having a relatively large central opening of substantially the diameter of said disk, the force of said permanent magnets being of substantially constant and uniform level and being sufficient when said disk is assembled with said record to retain said record in non-slipping driving engagement with another record with which another similar compensator is assembled when said records each with its compensator are mounted in juxtaposition for revolution with said turntable.

10. In a compensator of the class described, a disk with flat parallel horizontal sides and a central vertical opening for the reception of a vertical post of a relatively small diameter of a phonograph turntable, a plurality of individual permanent bar magnets carried by said disk within the cross sectional area thereof, said permanent bar magnets being disposed parallel to each other and in cavities which extend to the periphery of said disk, said disk having such cavities, said magnets being so arranged that different poles of one magnet and its neighboring magnet are relatively adjacent each other, and means upon the periphery of said disk for supporting and driving a phonograph record having a relatively large central opening of substantially the diameter of said disk, said record being adapted for use with a phonograph having a turntable, the force of said permanently magnetized material being of substantially constant and uniform level and being sufficient to retain a record supported by said disk in non-slipping driving relation to another similar record supported by another similar disk when said records are mounted in juxtaposition for revolution with said turntable.

11. A compensator of the class described, said compensator comprising a disk with planar parallel horizontal sides and a central vertical opening or relatively small diameter for the reception of a post of a phonograph turntable, said disk being formed with cavities extending radially to the periphery of said disk and disposed in a plane substantially parallel to that of said sides for the reception of permanently magnetized material, flexing openings in said disk, permanent magnetized material within said cavities, and a mount upon the periphery of said disk for detachably supporting and driving a phonograph record having a central opening of relatively large diameter, the outside diameter of said disk and that of said opening of said record being substantially the same, said record being adapted for use with a phonograph having a turntable, the force of said permanently magnetized material being of substantially constant and uniform level and being sufficient to retain a record supported by said disk in non-slipping driving relation to another similar record supported by another similar disk when said records are mounted in juxtaposition for revolution with said turntable.

12. In a compensator of the class described, a disk having parallel planar and horizontal sides, a central vertical opening the axis of which is normal to the plane of said sides for the reception of a central post of relatively small diameter of a phonograph turntable, the periphery of said disk having means engaging the periphery of a central opening of relatively large diameter of a phonograph record for supporting and driving said record, the diameter of said opening of said record and of said disk being substantially equal, and a permanent horse shoe magnet disposed within the cross sectional area of said disk with one leg upon one side and the other leg upon the other side of said central opening and revoluble with said disk, the magnetic force of said magnet being of substantially constant and uniform level and being sufficient to retain a record with which said compensator is assembled in non-slipping driving engagement with another record with a similar compensator assembled therewith when said records each with its compensator are mounted in juxtaposition for revolution with the turntable.

13. A phonograph record device adapted to be played upon a phonograph having a record changer and a central vertical post, said changer being adapted to hold a stack of records in storage or non-playing position and to release the lower record of the stack upon the top of a record upon the turntable after said second mentioned record has been played; said record having a vertical central opening adapted to receive a post of a horizontal phonograph turntable, a plane surface surrounding said center which embodies a sound track, and permanent magnetized material therein of a magnetic force sufficient to form a non-slipping driving engagement between itself and another similar record when one is being currently played and has been disposed upon the other which previously having been played is revolving with the turntable and insufficient magnetic force to hold it against the force of gravity from being dropped from the stack of such records in such storage during a changing operation and prior to its having been so placed in playing position.

14. A phonograph record having a peripheral planar surface portion embodying a sound track and a central portion embodying permanently magnetic material, said central portion having an opening for the reception of a central post of a phonograph turntable, the force of said permanently magnetized material being of a substantially constant and uniform level and being sufficient to retain said record in non-slipping driving engagement with another similar record when said records are disposed in juxtaposition upon the turntable, the axis of said opening being normal to the sides of said record.

15. A phonograph record having a peripheral portion embodying a sound track, a central portion including an opening normal to the sides of said record for the reception of a post of a phonograph turntable, and a permanently magnetized horse-shoe magnet disposed within a cross-sectional area of said central portion, one leg of said magnet being disposed upon one side of said opening and the other leg being disposed upon the other side thereof, the force of said permanently magnetized horse-shoe magnet being of substantially constant and uniform level and being sufficient to retain said record in non-slipping driving engagement with another similar record when said records are mounted in juxtaposition upon said turntable.

16. A method of producing a molded record device which comprises the steps of placing discrete material permanently magnetized at a uniform level in a capsule and molding said capsule with said discrete material therewithin into said device.

17. A method of producing a compensator of the class described by altering a conventional adapter or compensator; said conventional adapter having a surface bounding a central opening for the reception of a relatively small spindle, an outer rim adapted to interfit with the relatively large opening of a record, a plurality of spokes joining said surface and said rim, and driving projections extending vertically from said spokes in each direction; said method comprising: the steps of attaching permanent bar magnets to each side of a plurality of said spokes, the thickness of the permanent magnets so attached being no more than the height of said driving projections over the corresponding plane of said spokes, and filling in with plastic material the remaining volume between the planes represented by the tops of the oppositely extending driving projections and the cylindrical volume formed by vertical extension in each direction of said central opening to said planes, thereby producing a relatively thick flat-sided permanently magnetic compensator.

18. A method of producing a compensator of the class described by altering a conventional adapter; said conventional adapter having an outer rim adapted to interfit with an opening of relatively large diameter in a phonograph record, an inner opening of relatively small diameter adapted to receive a relatively small spindle, and formations joining said opening and said rim, the horizontal plane wherein one edge of said rim lies being above said formations and the horizontal plane wherein the opposite edge lies being below said formations; said method comprising the steps of placing permanently magnetic material in that portion of the volume between the planes joining each edge of said rim which lies between said rim and the periphery of said opening and filling the remaining part of said volume with plastic material, thus building up said adapter into a magnetic compensator having flat continuous surfaces on each horizontal side thereof surrounding said central opening.

19. A method of producing a phonograph record device; said record device being adapted for use upon a phonograph having a tone arm and associated with a record changer with a plurality of other similar record devices held in a stack and the lowest of said record devices of said stack being successively released to fall by gravity upon the top of a then adjacent record device which has been played by engagement with the tone arm and thereafter both of said record devices being revolved in engagement with the tone arm; said method comprising: establishing therewithin a permanent magnetic force at a substantially constant and uniform level of pole strength of such value that (1) when such force is exerted upon another similar record held above and in juxtaposition thereto it is less than the separating force thereof due to gravity when such first mentioned record is free to fall and (2) when such force is exerted upon another such record which is being revolved it will overcome the maximum drag torque of a tone arm applied to the uppermost of such records whereby said records will revolve in unison.

20. A compensator adapted selectively to convert any one of a plurality of phonograph records having a central opening of relatively large diameter and a supporting formation surrounding said opening to a record unit for use upon a phonograph turntable having a vertical central post of relatively small diameter; said phonograph being associated with a record changer adapted to release for delivery by gravity successive records from storage position one upon the top of another into playing position upon said turntable each other than the first upon the top of another and in juxtaposition thereto after the completion of the playing of the record upon the top of which said record is so delivered from storage position; said compensator having parallel plane horizontal surfaces, permanently magnetized material embodied in said compensator between said surfaces, a central vertical opening of a diameter to receive said post, and a peripheral mount adapted detachably to interfit with the formation surrounding the large central opening of said record thereby when said compensator is disposed within said opening forming a record unit and driving said record, said horizontal surfaces being spaced sufficiently far apart so that when said compensator is disposed within said opening and so joined to said record to form said unit said surfaces are spaced respectively above and below all other parts of said unit, the force of said permanently magnetized material being substantially uniform and constant and being insufficient to overcome gravity when one of said units is released from storage position and said force being sufficient to overcome the rotational inertia of said record units when placed in juxtaposition with another similar record unit and to drive the two in unison, whereby when one of said units is placed in juxtaposition to another similar unit including another similar compensator engagement therebetween is solely through said surfaces adjacent each other and the revolution of either of said units acting through the magnetic force of said compensator drives said other unit without slippage therebetween.

21. A compensator adapted selectively to convert any one of a plurality of phonograph records having a central opening of relatively large diameter and a supporting formation surrounding said opening to a record unit for use upon a phonograph turntable having a vertical central post of relatively small diameter; said phonograph being associated with a record changer adapted to release for delivery by gravity successive records from storage position one upon the top of another into playing position upon said turntable, each other than the first upon the top of another record with such a compensator and in juxtaposition thereto after the completion of the playing of the record upon the top of which said record is so delivered from storage position; said compensator having parallel plane horizontal surfaces, permanently magnetized material embodied in said compensator between said surfaces, a central vertical opening of a diameter to receive said post, flexing slots within said compensator, and a peripheral mount adapted detachably to interfit with the formation surrounding the large central opening of said record thereby when said compensator is disposed within said opening forming a record unit and driving said record, said horizontal surfaces being spaced sufficiently far apart so that when said compensator is joined to said record to form said unit said surfaces are spaced above and below all other parts of said unit, the force of said permanently magnetized material being substantially uniform and constant and being insufficient to overcome gravity when one of said units is delivered from storage position and said force being sufficient to overcome the rotational inertia of said record units when placed in juxtaposition as aforesaid and to drive the two record units in unison, whereby when one of said units is placed in juxtaposition to another unit with another similar compensator engagement therebetween is solely through said surfaces adjacent each other and the revolution of either of said units acting through the force of said compensator drives said other unit without slippage therebetween.

22. A phonograph record adapted to be played upon a phonograph having a turntable and a record changer, said record changer being adapted to hold a stack of records in storage or non-playing position and to release the lowest record of the stack upon the top of the record upon said turntable after a previously released record has been played; said phonograph records each embodying permanently magnetized material which exerts a given substantially uniform and constant magnetic force, the value of such force as exerted upon another similar record embodying permanently magnetized material held above and in juxtaposition thereto in storage position being less than the separating force thereof due to gravity when the lower of said two last above mentioned records is released and free to fall and the value of such force as so exerted being sufficient to form a non-slipping driving engagement between said records embodying permanently magnetized material when one thereof has fallen upon another thereof which is in playing position upon the turntable.

23. A record embodying a permanent magnet and having a sound track adapted for use with other similar records, each embodying a permanent magnet, upon a phonograph which is associated with a record changer; said phonograph having a turntable, a tone arm and a needle in said tone arm for engaging a sound track in a record upon the turntable; said record changer being adapted to hold a stack of such records in storage or non-playing position and successively to release the lowest of said records; the force of the permanent magnet within each of two of said records in juxtaposition, a first and a second record, being of a substantially constant and uniform level, and in accordance with the following formulae:

(1) $$F_M=\frac{M_1M_2}{\mu r^2}$$

where $F_M$=magnetic force (dynes)
$M_1$=pole strength of magnet of first record (unit poles)
$M_2$=pole strength of magnet of second record (unit poles)
$\mu$=permeability of medium between magnets
$r$=distance between poles (cm.)

(2) $$F_s=ma$$

where $F_s$=separating force (dynes)
$m$=mass of record (grams)
$a$=acceleration due to gravity (cm./sec.$^2$)

and (3) $$F_M<F_S$$

and (4) $$F_Mr_M>F_Dr_D$$

where $r_M$=effective moment arm or radius at which the magnetic force ($F_M$) acts relative to the center of revolution of the turntable (cm.)
$F_D$=drag force of the phonograph needle on the record which tends to create slippage (dynes)
$r_D$=effective moment arm or radius at which the drag force ($F_D$ acts relative to the center of revolution of the turntable (cm.)
$F_Mr_M$=magnetic driving torque (dyne cm.)
$F_Dr_D$=phonograph needle drag torque (dyne cm.)

24. A phonograph record; said record being adapted to be played upon a phonograph having a turntable and with a record changer associated therewith, said record changer being adapted to release successive records into playing position, the first thereof so released falling by gravity upon said turntable and successive records thereafter falling upon the top of the preceding record so released; said record having a permanently magnetized portion and embodying a sound track separate from said permanently magnetized portion, the force of said permanently magnetized portion being substantially constant and uniform and insufficient to overcome gravity when said record is released and said force being sufficient to hold said record when upon said turntable in non-slipping driving engagement with another similar record in juxtaposition thereto upon the turntable.

25. In combination, a phonograph record having a relatively large central opening and a compensator adapted to position said record upon a turntable of a phonograph having a vertical central post of a diameter smaller than that of said central opening, said central opening being bounded by a horizontal tongue parallel to the flat sides of said record and said compensator having a groove with which said tongue interfits whereby when said compensator is introduced within said opening said record may be revolved by the revolution of said compensator; said record and said compensator when assembled therewith being adapted to be mounted upon a record changer associated with the phonograph as one of a stack of similar records with similar compensators assembled with each thereof and to be released from storage position successively to fall by gravity into playing position upon the turntable of the phonograph, the first thereof so released falling upon said turntable and successive records thereafter falling upon the top of the preceding record so released; said compensator embodying permanently magnetized material, the force of said permanently magnetized material being of a substantially constant and uniform level and such force being insufficient to overcome gravity when a record with which the compensator is assembled is released and such force being sufficient to retain such a record in non-slipping driving engagement with another such record with such a compensator when both such records are disposed upon said turntable; said compensator having a central vertical opening of relatively small diameter for the reception of said post and uninterrupted and planar parallel horizontal sides, the planes of said sides respectively being disposed above and below the horizontal plane of the upper and lower portions of said record with which the compensator is assembled and being of sufficient diameter so that all contact between records when a plurality thereof is placed one on top of another and with said openings in alignment is between such surfaces.

26. A method of producing a phonograph record device; said record device being adapted for use with a plurality of other similar record devices held in a stack and the lowest of said record devices of said stack being successively released to fall by gravity upon the top of and adjacent another record device which has been played by engagement with a tone arm of the phonograph and thereafter said record devices which have been successively released being revolved with the upper thereof in engagement with the tone arm; said method comprising: the steps of embedding permanently magnetizable material within the cross-sectional area of said record device and permanently magnetizing said material by establishing therewithin a permanent magnetic force at a substantially constant and uniform level of pole strength of such value that (1) when such force is exerted upon another similar record held above and in juxtaposition thereto it is less than the separating force thereof due to gravity when such first mentioned record is free to fall and (2) when such force is exerted upon another such record which is being revolved it will overcome the maximum drag torque of a tone arm applied to the uppermost of such records whereby said records revolve in synchronism.

27. A method of producing a compensating disk of the class described; said compensating disk being adapted for use with a phonograph record which with said disk installed therein is adapted for use with a plurality of other similar records with similar disks in a stack and the lowest of said records being successively released to fall by gravity upon the top of and adjacent another record with a similar disk which has been played by engagement with a tone arm of a phonograph and thereafter said records each with its respective disk which have been successively released being revolved in engagement with each other and with the upper thereof in engagement with the tone arm; said method comprising the steps of: forming a central portion of said disk with flat parallel sides embracing magnetizable material, and permanently magnetizing said material at a substantially uniform and constant level of pole strength of a force of such value that when said disk is assembled with a record (1) when such force is exerted upon another similar disk assembled with another record held above and in juxtaposition thereto it is less than the separating force thereof due to gravity when such first mentioned record is free to fall and to be revolved and (2) when such force is exerted upon another similar disk assembled with another record, such last previously mentioned record being revolved with said first mentioned record, it will overcome the maximum drag torque of a tone arm applied to the uppermost of such records whereby said records will revolve in synchronism.

28. A method of producing a phonograph record; said record being adapted for use upon a phonograph having a tone arm and associated with a record changer with a plurality of other similar records held by a record changer in a stack and the lowest of said records of said stack being successively released to fall by gravity upon the top of a then adjacent record which has been played by engagement with the tone arm, thereafter both of said records being revolved in juxtaposition to each other and with the uppermost in engagement with the tone arm; said method comprising: the steps of embedding magnetic material within the cross-sectional area of said record and establishing a permanent magnetic force within said material at a substantially constant and uniform level of pole strength of such value that (1) when such force is exerted upon another similar record in the stack held above and in juxtaposition thereto it is less than the separating force thereof due to gravity when such first mentioned record is free to fall and (2) when such force is exerted upon another similar record which is being revolved in juxtaposition therewith it will overcome the maximum drag torque of a tone arm applied to the uppermost of said records whereby said records will revolve in synchronism.

29. A method of producing a phonograph record for use with a phonograph having a turntable and tone arm which comprises the steps of cutting a sound track in each of two planar surfaces, placing a sheet of magnetizable material between said surfaces, joining said surfaces together with said sheet therebetween and permanently magnetizing said material at a substantially uniform and constant level of force, said level of force being sufficient magnetically to lock two such records together when placed in juxtaposition so that when the lower thereof is revolved the upper thereof will revolve in synchronism therewith, such level being sufficiently high to overcome the maximum drag torque of a tone arm of a phonograph applied to the upper of such records when disposed upon another thereof upon said turntable and both records are revolved by said turntable.

30. A method of producing a permanently magnetized phonograph record device having a sound track; said permanently magnetized record device being adapted for use with other similar permanently magnetized record devices upon a phonograph which is associated with a record changer; said phonograph having a turntable, a tone arm and a needle in said tone arm for engaging a record upon the turntable; said record changer being adapted to hold a stack of such records in storage or non-playing position and to release the lowest of said records upon the turntable and upon the top of another similar record thereupon; said method comprising forming a permanent magnet of a constant and substantially uniform level of strength in each of said records in accordance with the following formulae:

(1) $$F_M=\frac{M_1M_2}{\mu r^2}$$

where $F_M$=magnetic force (dynes)

$M_1$=pole strength of magnet of one of said records (unit poles)

$M_2$=pole strength of magnet of another of said records in juxtaposition with said immediately above mentioned record (unit poles)

$\mu$=permeability of medium between magnets $r$=distance between poles (cm.)

(2) $$F_s=ma$$

where $F_s$=separating force (dynes)

$m$=mass of record device (grams)

$a$=acceleration due to gravity (cm./sec.$^2$)

and (3) $$F_M<F_s$$

and (4) $$F_Mr_M>F_Dr_D$$

where $r_M$=effective moment arm or radius at which the magnetic force ($F_M$) acts relative to the center of revolution of the turntable (cm.)

$F_D$=drag force of the phonograph needle on the record which tends to create slippage (dynes)

$r_D$=effective moment arm or radius at which the drag force ($F_D$) acts relative to the center of revolution of the turntable (cm.)

$F_Mr_M$=magnetic driving torque (dyne cm.)

$F_Dr_D$=phonograph needle drag torque (dyne cm.)

References Cited in the file of this patent

UNITED STATES PATENTS

| | | |
|---|---|---|
| 425,768 | Ezell | Apr. 15, 1890 |
| 1,266,767 | Brosius | May 21, 1918 |
| 1,414,522 | Morgan | May 2, 1922 |
| 1,677,919 | Hansen | July 24, 1928 |
| 1,755,743 | Morrison | Apr. 22, 1930 |
| 1,827,051 | Thomas | Oct. 13, 1931 |
| 2,136,370 | Bockius et al. | Nov. 15, 1938 |
| 2,188,091 | Baermann | Jan. 23, 1940 |
| 2,253,014 | Burke | Aug. 19, 1941 |
| 2,295,938 | Dech | Sept. 15, 1942 |
| 2,330,718 | Kallmann | Sept. 29, 1943 |
| 2,501,465 | Caramanoff | Mar. 21, 1950 |
| 2,517,440 | Kleber | Aug. 1, 1950 |
| 2,536,922 | Durbrow | Jan. 2, 1951 |
| 2,536,979 | Furedi | Jan. 2, 1951 |
| 2,544,010 | Giannantonio | Mar. 6, 1951 |
| 2,557,399 | Teetor | June 19, 1951 |
| 2,570,625 | Zimmerman et al. | Oct. 9, 1951 |
| 2,619,351 | Kennedy | Nov. 25, 1952 |
| 2,645,499 | Meyers | July 14, 1953 |

FOREIGN PATENTS

| | | |
|---|---|---|
| 725,759 | France | Feb. 16, 1932 |
| 386,842 | Great Britain | Jan. 26, 1933 |
| 635,868 | Great Britain | Apr. 19, 1950 |